(12) United States Patent
Han et al.

(10) Patent No.: US 10,056,957 B2
(45) Date of Patent: Aug. 21, 2018

(54) METHOD AND APPARATUS FOR MIXED ANALOG/DIGITAL BEAMFORMING

(75) Inventors: Shuangfeng Han, Gyeonggi-do (KR); Bruno Clerckx, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/572,438

(22) Filed: Aug. 10, 2012

(65) Prior Publication Data

US 2013/0039401 A1  Feb. 14, 2013

(30) Foreign Application Priority Data

Aug. 11, 2011  (KR) .................. 10-2011-0080068

(51) Int. Cl.
*H04B 7/06* (2006.01)
*H04B 7/0413* (2017.01)
*H04L 27/26* (2006.01)
*H04L 1/00* (2006.01)

(52) U.S. Cl.
CPC ......... *H04B 7/0617* (2013.01); *H04B 7/0413* (2013.01); *H04L 1/0025* (2013.01); *H04L 27/2626* (2013.01)

(58) Field of Classification Search
CPC ... H04B 7/0617; H04B 7/0413; H04L 1/0025; H04L 27/2626
USPC .............. 375/222, 224, 267, 296, 299, 316; 342/368, 372, 373
See application file for complete search history.

(56) References Cited

U.S. PATENT DOCUMENTS

| 6,184,827 B1 * | 2/2001 | Dendy et al. ................ 342/372 |
| 6,336,033 B1 | 1/2002 | Yamaguchi et al. |
| 2006/0126753 A1 | 6/2006 | Jwa et al. |
| 2009/0046800 A1 | 2/2009 | Xu et al. |
| 2009/0058724 A1 * | 3/2009 | Xia et al. ...................... 342/368 |
| 2009/0322613 A1 | 12/2009 | Bala et al. |

(Continued)

FOREIGN PATENT DOCUMENTS

| JP | 3348863 B2 | 11/2002 |
| JP | 2009-536008 | 10/2009 |

(Continued)

OTHER PUBLICATIONS

International Search Report dated Feb. 21, 2013 in connection with International Application No. PCT/KR2012/006413, 3 pages.

(Continued)

*Primary Examiner* — Syed Haider (57) ABSTRACT

A method provides mixed analog/digital beamforming by a transmitter in a mobile communication system. The method includes converting a modulation symbol into a parallel symbol stream, performing digital beamforming on the parallel symbol stream, performing an IFFT operation on the digital-beamformed parallel symbol stream to generate a time-domain symbol, converting the IFFT-operated time-domain symbol into a serial time-domain symbol, inserting a CP into the serial time-domain symbol, performing a DAC operation on the CP-inserted symbol to generate an analog signal, and performing analog beamforming by multiplying the analog signal by the analog beamforming precoder optimized for the first subcarrier transmitted through at least one RF channel.

25 Claims, 11 Drawing Sheets

(56) References Cited

U.S. PATENT DOCUMENTS

| | | |
|---|---|---|
| 2010/0061360 A1 | 3/2010 | Chen et al. |
| 2010/0189055 A1* | 7/2010 | Ylitalo ............................ 370/329 |
| 2010/0194629 A1 | 8/2010 | Craig et al. |
| 2011/0019631 A1 | 1/2011 | Kotecha et al. |
| 2011/0291891 A1* | 12/2011 | Nsenga et al. ................. 342/373 |
| 2012/0220238 A1* | 8/2012 | Hosoya ................. H04B 7/0695 455/63.4 |

FOREIGN PATENT DOCUMENTS

| | | | | |
|---|---|---|---|---|
| JP | WO 2011055535 A1 * | 5/2011 | ............ | H04B 7/0695 |
| JP | 2011517373 A | 6/2011 | | |

OTHER PUBLICATIONS

Written Opinion of the International Searching Authority dated Feb. 21, 2013 in connection with International Application No. PCT/KR2012/006413, 4 pages.

Extended European Search Report dated Dec. 18, 2014 in connection with European Application No. 12822214.8; 11 pages.

Nsenga, et al.; "Mixed Analog/Digital Beamforming for 60 GHz MIMO Frequency Selective Channels"; IEEE International Conference; May 23, 2010; 6 pages.

Hang, et al.; "A Hybrid Adaptive Antenna Array"; IEEE Transactions on Wireless Communications; vol. 7, No. 5; May 1, 2010; 10 pages.

Notice of Preliminary Rejection dated Jun. 20, 2016 in connection with Japanese Application No. 2014-524945, 14 pages.

First Office Action dated Jun. 7, 2016 in connection with Chinese Application No. 2012800392492, 15 pages.

Communication from a foreign patent office in a counterpart foreign application, Text of Notice of Patent Grant, Korean Application No. KR 10-2011-0080068, dated Feb. 26, 2018, 3 pages.

Communication from a foreign patent office in a counterpart foreign application, Text of Notice of Preliminary Rejection, Korean Application No. KR 10-2011-0080068, dated Dec. 15, 2017, 14 pages.

Nsenga, J., et al., "Mixed analog/digital beamforming for 60 GHz MIMO frequency selective channels," IEEE ICC 2010, May 27, 2010, 6 pages.

Second Office Action dated Feb. 4, 2017 in connection with Chinese Application No. 2012800392492, 10 pages.

Communication from a foreign patent office in a counterpart foreign application, European Patent Office, "Communication pursuant to Article 94(3) EPC," European Application No. EP12822214.8, Jun. 7, 2018, 7 pages.

* cited by examiner

METHOD AND APPARATUS FOR MIXED ANALOG/DIGITAL BEAMFORMING

CROSS-REFERENCE TO RELATED APPLICATION(S) AND CLAIM OF PRIORITY

The present application is related to and claims priority under 35 U.S.C. § 119 to an application filed in the Korean Intellectual Property Office on Aug. 11, 2011 and assigned Serial No. 10-2011-0080068, the contents of which are incorporated herein by reference.

TECHNICAL FIELD OF THE INVENTION

The present disclosure relates generally to a wireless communication system, and in particular, the present disclosure relates to a method and apparatus for mixed analog/digital beamforming in a wireless communication system.

BACKGROUND OF THE INVENTION

In order to design a multi-Gbps wireless communication system, efforts to use a 60 GHz frequency band are maid mainly by adoption of a large unlicensed frequency band. The use of this can support an application program requiring a high bandwidth, such as uncompressed high-definition (HD) multimedia.

Current multi-antenna wireless communication systems are based on a digital beamforming (DBF) scheme in a low carrier frequency band (5 GHz). In this structure, each antenna has its own analog front end (AFE) chain, and each AFE chain performs a conversion between a digital baseband domain and an analog radio frequency (RF) domain. Also, a transmitter includes a digital-to-analog converter (DAC), and a receiver includes an analog-to-digital converter (ADC).

In a 60 GH band, a wireless communication system may have 8 or more antenna sets, but a digital beamforming scheme is not practically viable due to high cost and large power consumption required in an AFE.

In addition, a mixed antenna selection (AS)/DBF scheme for solving this problem also does not provide a gain by an antenna set or beamforming, thus leading to large performance degradation.

SUMMARY OF THE INVENTION

To address the above-discussed deficiencies of the prior art, it is a primary object of the present disclosure is to provide a method and apparatus for mixed analog/digital beamforming.

Another object of the present disclosure is to provide a method and apparatus for preventing performance degradation in a mixed analog/digital beamforming system.

Another object of the present disclosure is to provide a digital beamforming precoder for compensating other terminals than a terminal 1 for a phase difference caused by an analog beamforming precoder fixed to the terminal 1, when all the terminals use the same analog beamforming precoder in a mixed analog/digital beamforming system.

According to an aspect of the present disclosure, a method for mixed analog/digital beamforming by a transmitter in a mobile communication system includes: converting a modulation symbol coded and modulated according to a predetermined modulation level into a parallel symbol stream; performing digital beamforming on the parallel symbol stream by multiplying a second subcarrier to be transmitted to a second receiver, by a digital beamforming precoder determined to compensate the second subcarrier for an analog beamforming precoder optimized for a first subcarrier to be transmitted to a first receiver; performing an inverse fast Fourier transform (IFFT) operation on the digital-beamformed parallel symbol stream to generate a time-domain symbol; converting the IFFT-operated time-domain symbol into a serial time-domain symbol; inserting a cyclic prefix (CP) into the serial time-domain symbol; performing a digital-to-analog converter (DAC) operation on the CP-inserted symbol to generate an analog signal; and performing analog beamforming by multiplying the analog signal by the analog beamforming precoder optimized for the first subcarrier transmitted through at least one radio frequency (RF) channel.

According to another aspect of the present disclosure, an apparatus of a transmitter for performing mixed analog/digital beamforming in a mobile communication system includes: a serial-to-parallel converter (SPC) unit for converting a modulation symbol coded and modulated according to a predetermined modulation level into a parallel symbol stream; a precoder for performing digital beamforming on the parallel symbol stream by multiplying a second subcarrier to be transmitted to a second receiver, by a digital beamforming precoder determined to compensate the second subcarrier for an analog beamforming precoder optimized for a first subcarrier to be transmitted to a first receiver; an inverse fast Fourier transform (IFFT) unit for performing an IFFT operation on the digital-beamformed parallel symbol stream to generate a time-domain symbol; a parallel-to-serial converter (PSC) unit for converting the IFFT-operated time-domain symbol into a serial time-domain symbol; a cyclic prefix (CP) inserter for inserting a CP into the serial time-domain symbol; a digital-to-analog converter (DAC) unit for performing a DAC operation on the CP-inserted symbol to generate an analog signal; and a radio frequency (RF) unit for performing analog beamforming by multiplying the analog signal by the analog beamforming precoder optimized for the first subcarrier transmitted through at least one RF channel.

According to another aspect of the present disclosure, a method for operating a receiver in a mobile communication system includes: measuring a reference signal transmitted by a transmitter; determining a digital beamforming precoder and an analog beamforming precoder for the receiver based on the measurement of the reference signal; and feeding back information representing the digital beamforming precoder and the analog beamforming precoder to the transmitter.

According to another aspect of the present disclosure, an apparatus of a receiver in a mobile communication system includes: a modem for transmitting/receiving information to/from a transmitter; and a beam selecting unit for measuring, through the modem, a reference signal transmitted by the transmitter, determining a digital beamforming precoder and an analog beamforming precoder for the receiver based on the measurement of the reference signal, and feeding back information representing the digital beamforming precoder and the analog beamforming precoder to the transmitter.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Exemplary embodiments of the present disclosure will be described herein below with reference to the accompanying drawings. In the following description, detailed descriptions of well-known functions or configurations will be omitted since they would unnecessarily obscure the subject matters of the present disclosure. Also, the terms used herein are defined according to the functions of the present disclosure. Thus, the terms may vary depending on users' or operators' intentions or practices. Therefore, the terms used herein should be understood based on the descriptions made herein.

Hereinafter, a description will be given of a method and apparatus for mixed analog/digital beamforming according to exemplary embodiments of the present disclosure.

The present disclosure relates to a wireless communication system, and in particular, to a method and apparatus for preventing a performance degradation caused by the use of mixed beamforming in a system using mixed analog/digital beamforming.

In a 60 GH band, a wireless communication system may have 8 or more antenna sets, but a digital beamforming scheme is not practically viable due to high cost and large power consumption required in an AFE. In order to solve this problem, there is proposed a low-complexity structure that uses AFE chains fewer than available antennas.

In this structure, in order to reduce the number of channels necessary for digital beamforming, spatial signal processing (SSP) is used in an analog RF domain. SSP technology that is most widely used in an analog RF domain is based on an antenna selection (AS) scheme. The AS scheme, antennas fewer than available AFE chains are used for digital beamforming, and the other antennas are not used for digital beamforming.

However, a mixed AS/DBF scheme does not provide a gain by an antenna set or beamforming, thus leading to large performance degradation. Therefore, the present disclosure provides a method and apparatus for preventing the performance degradation. In addition, the present disclosure uses a frequency division multiple access/orthogonal frequency division multiple access (FDMA/OFDMA) scheme to achieve a frequency-domain scheduling gain based on frequency selection.

Hereinafter, the number of AFE chains is denoted by n or D, and the total number of antennas is denoted by N. Also, it is assumed that a plurality of terminals receives a service through the above structure. In addition, a terminal in the present disclosure may be referred to as a receiver, and a base station (BS) may be referred to as a transmitter.

Figure 1:
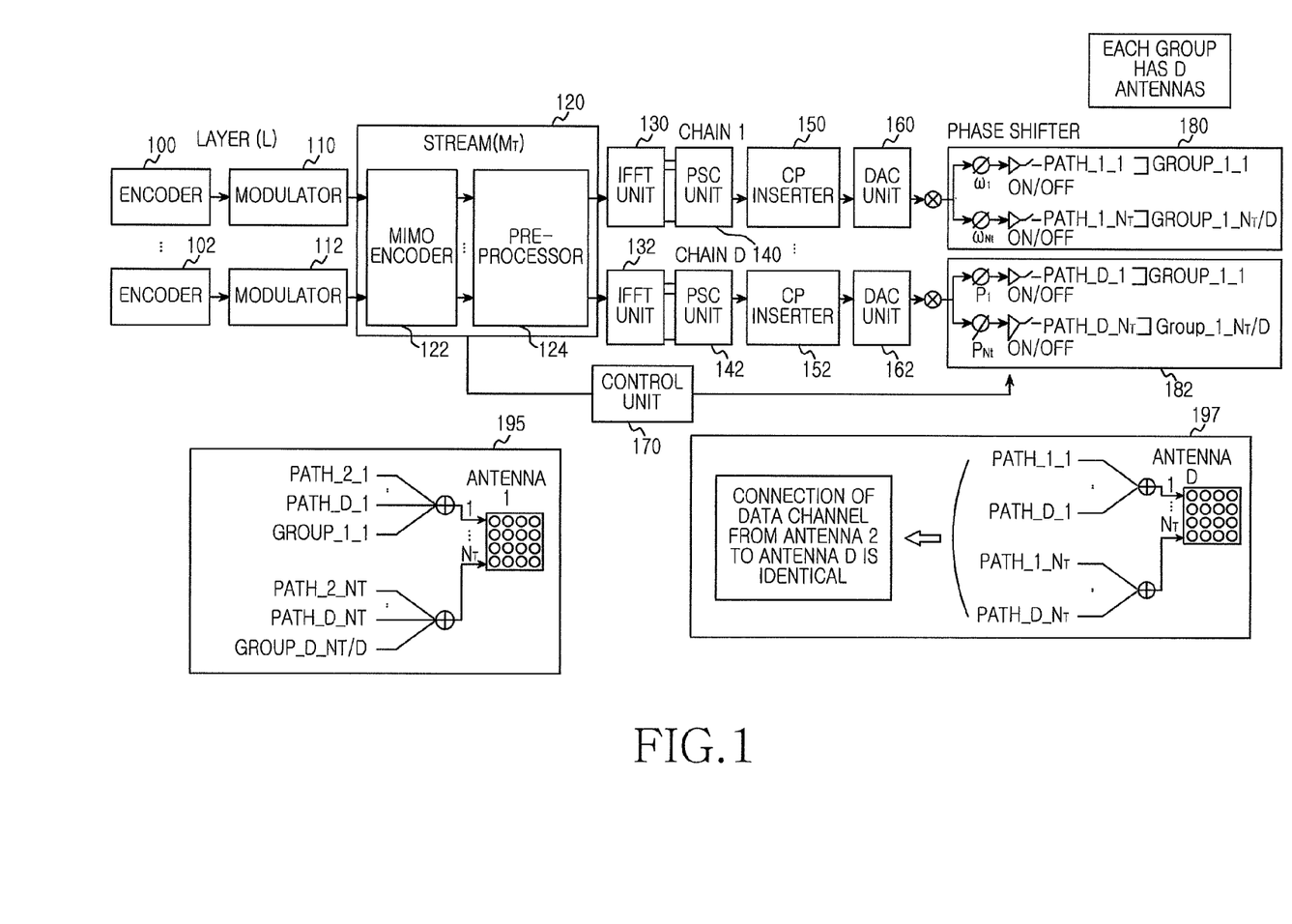
FIG. 1 illustrates a block diagram of a transmitter for mixed analog/digital beamforming according to various exemplary embodiments of the present disclosure.

FIG. 1 illustrates a block diagram of a transmitter for mixed analog/digital beamforming according to various exemplary embodiments of the present disclosure.

Referring to FIG. 1, a plurality of encoders 100 and 102 and a plurality of modulators 110 and 112 perform coding and modulation according to a predetermined modulation level. Herein, a serial-to-parallel converter (SPC) unit (not illustrated) for converting a modulated symbol into a parallel symbol stream may be disposed after each of the modulators 110 and 112.

A stream processor 120 includes a multi-input multi-output (MIMO) encoder 122 and a pre-processor 124. The multi-input multi-output (MIMO) encoder 122 performs MIMO encoding on each parallel symbol stream. The pre-processor 124 performs digital beamforming on the MIMO-encoded signal by multiplying a second subcarrier to be transmitted to a second terminal, by a digital beamforming precoder indicated by a digital phase offset determined to compensate the second subcarrier for an analog beamforming precoder optimized for a first subcarrier to be transmitted to a first terminal. A control unit 170 determines the analog beamforming precoder and the digital beamforming precoder.

Also, the control unit 170 may determine the on/off of a switch in phase shifter shifters 180 and 182, determine the use of a specific antenna, and determine a specific group 195/197 including the specific antenna.

The control unit 170 may transmit, to the phase shifters 180 and 182, a control signal for performing analog beamforming by multiplying an analog signal outputted by a DAC unit, by the analog beamforming precoder that is optimized for the first subcarrier transmitted through at least one RF channel and indicated by an analog phase offset. That is, the phase shifters 180 and 182 may perform analog beamforming according to the control signal.

Also, the control unit 170 may turn on/off the switch in the phase shifters 180 and 182 to select a specific antenna set among all the antennas.

A plurality of inverse fast Fourier transform (IFFT) units 130 and 132 perform an IFFT operation on the digital-beamformed parallel symbol stream to generate a time-domain symbol.

A plurality of parallel-to-serial converter (PSC) units 140 and 142 convert the IFFT-operated time-domain symbol into a serial time-domain symbol.

A plurality of cyclic prefix (CP) inserters 150 and 152 insert a CP into the serial time-domain symbol.

A plurality of digital-to-analog converter (DAC) units 160 and 162 perform a DAC operation on the CP-inserted symbol to generate an analog signal.

In FIG. 1, each of the groups 195 and 197 may include D antennas. Also, data channels for transmission of signals from the antenna 2 to the antenna D may be identical to each other.

Figure 2:
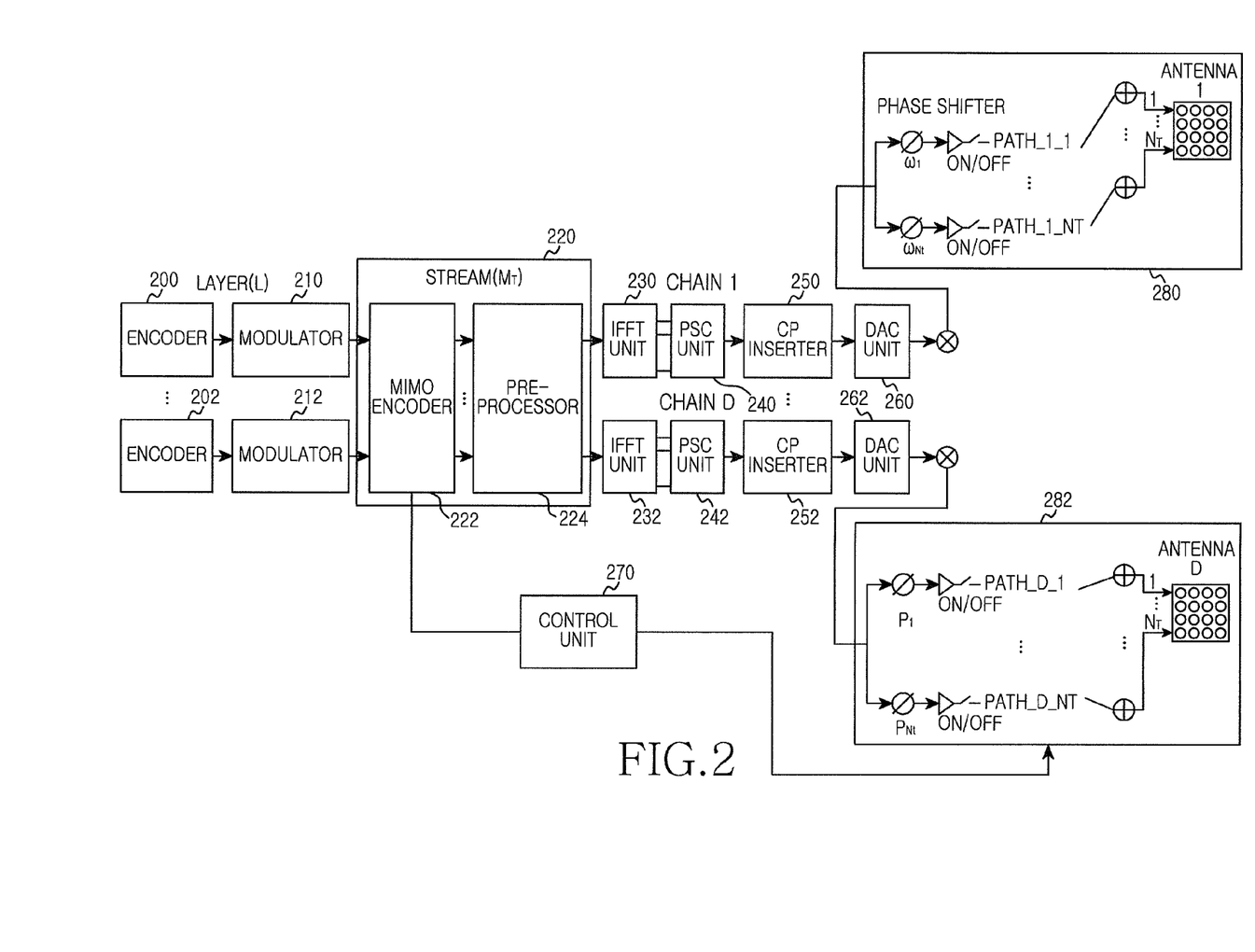
FIG. 2 illustrates a block diagram of a transmitter for mixed analog/digital beamforming according to other exemplary embodiments of the present disclosure.

In FIG. 1, each chain may be a transmitting/receiving (TX/RX) modem,

FIG. 2 illustrates a block diagram of a transmitter for mixed analog/digital beamforming according to other exemplary embodiments of the present disclosure.

Referring to FIG. 2, the structure of the components and the operations from encoders 200 and 202 to phase shifters 280 and 282 are the same or similar to those in FIG. 1 and a description thereof is omitted for brevity. However, in FIG. 2, an ith AFE chain is connected to an ith antenna set by a control signal of a control unit 270.

In this example, since space between the antennas is relatively large, a spatial correlation may be disregarded. In FIG. 2, in the example of a single user, all types of single-user MIMO schemes may be used, and in the example of multiple users, each RF chain may form one beam.

Figure 3:
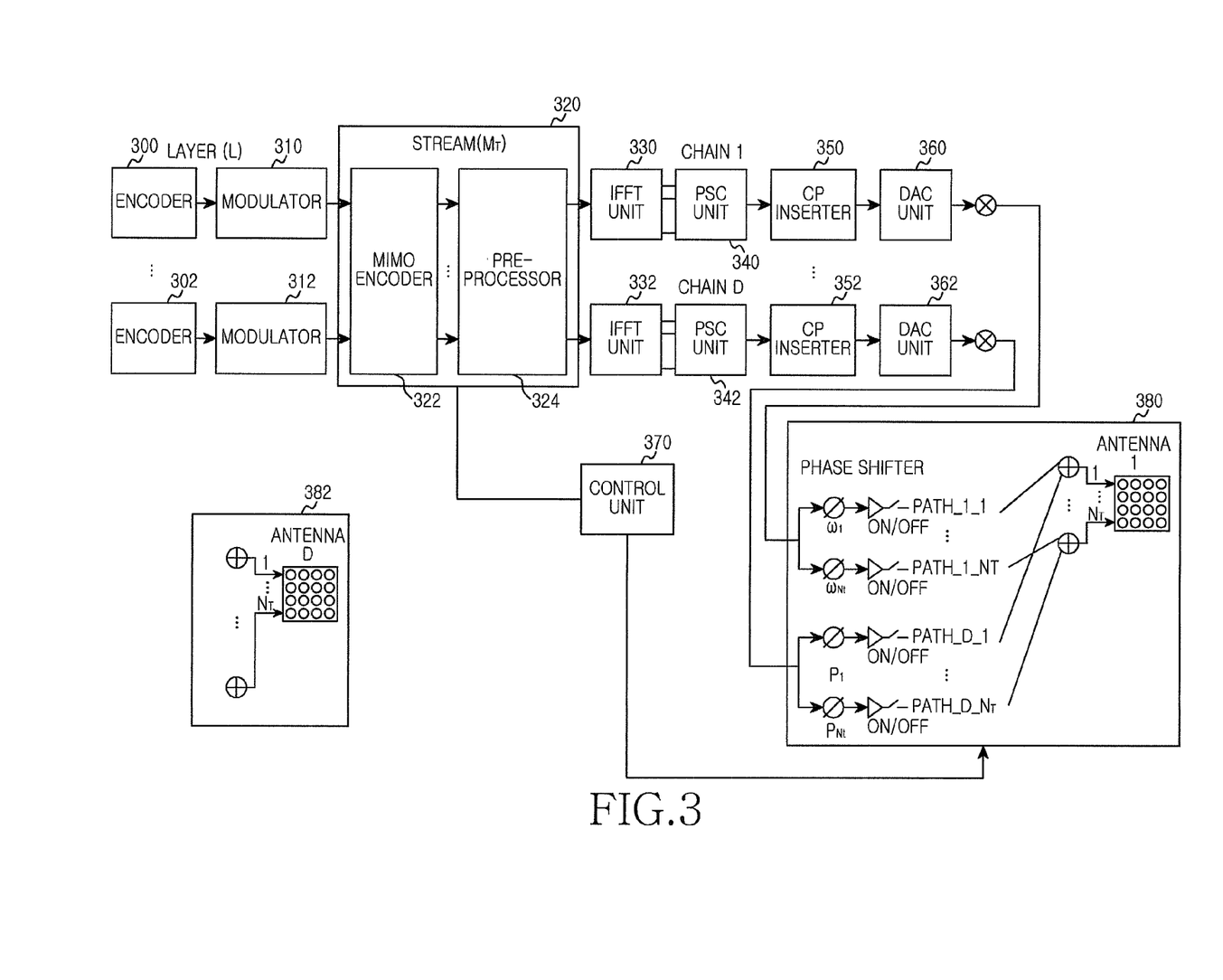
FIG. 3 illustrates a block diagram of a transmitter for mixed analog/digital beamforming according to yet other exemplary embodiments of the present disclosure.

FIG. 3 illustrates a block diagram of a transmitter for mixed analog/digital beamforming according to yet other exemplary embodiments of the present disclosure.

Referring to FIG. 3, the structure of the components and the operations from encoders 300 and 302 to phase shifters 380 and 382 or similar to those in FIG. 1 and a description thereof is omitted for brevity. However, in FIG. 3, all RF chains are connected to one antenna set, for example, to an antenna set 1, by a control signal of a control unit 270.

In this example, high-rank transmission may be supported for a single user. The reason for this is that all the RF chains should be allocated to a single user for rank 1 transmission.

Figure 4:
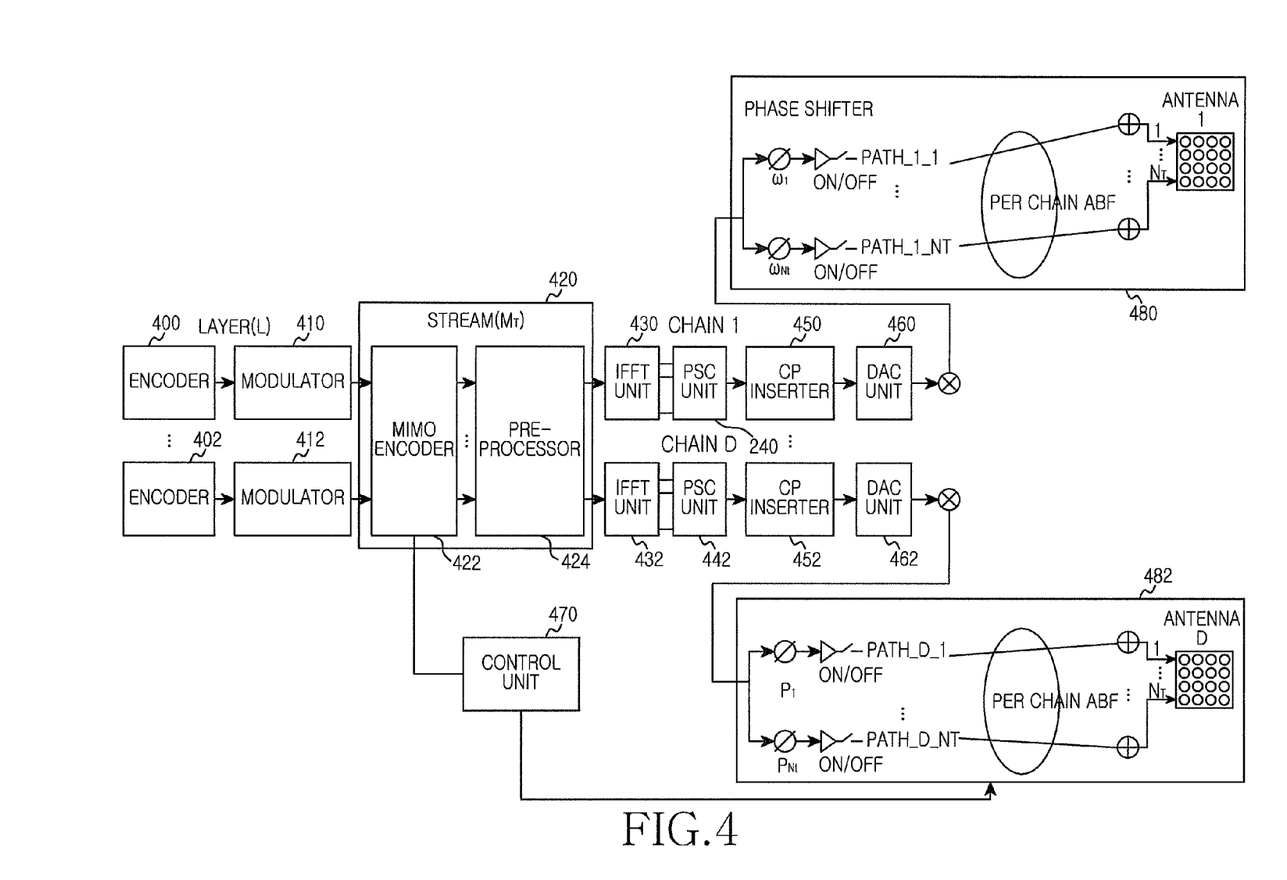
FIG. 4 illustrates a block diagram of a transmitter for mixed analog/digital beamforming according to still yet other exemplary embodiments of the present disclosure.

FIG. 4 illustrates a block diagram illustrating a configuration of a transmitter for mixed analog/digital beamforming according to still yet other exemplary embodiments of the present disclosure.

Referring to FIG. 4, the structure of the components and the operations from encoders 400 and 402 to phase shifters 480 and 482 are the same or similar to those in FIG. 1 and a description thereof is omitted for brevity. In FIG. 4, all RF chains are connected to different antenna sets by a control signal of a control unit 470, and analog beamforming for the respective RF chains are set in different directions.

In this example, high-rank transmission may not be supported for a single user. The reason for this is that all the RF chains should be allocated to a single user for rank 1 transmission and lack of ranks. In the example of multiple users, each RF chain may support one user.

Figure 5:
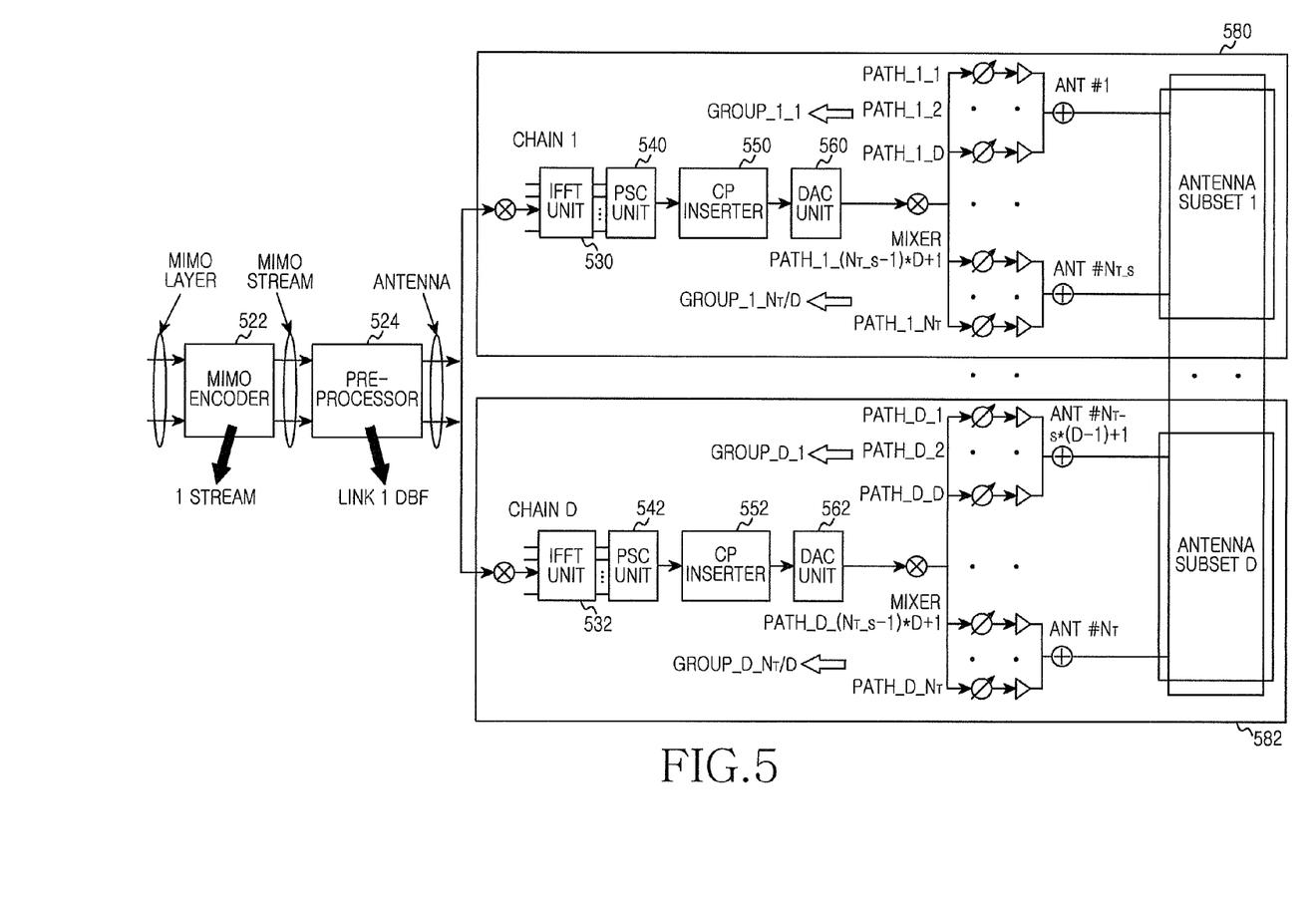
FIG. 5 illustrates a block diagram of a transmitter for mixed analog/digital beamforming according to yet other exemplary embodiments of the present disclosure.

FIG. 5 illustrates a block diagram of a transmitter for mixed analog/digital beamforming according to yet other exemplary embodiments of the present disclosure.

Referring to FIG. 5, the structure of the components and the operations from an MIMO encoder 522 to antennas 580 and 582 are the same or similar to those in FIG. 1 and a description thereof is omitted for brevity.

In FIG. 5, each AFE chain is connected to antenna subset, and digital beamforming is used to adjust a beam direction of a merged signal around an analog beam direction for each subcarrier.

In FIG. 5, it is assumed that Nt=D*Nt_s. Herein, Nt_s is the number of antennas in each antenna subset.

Figure 6:
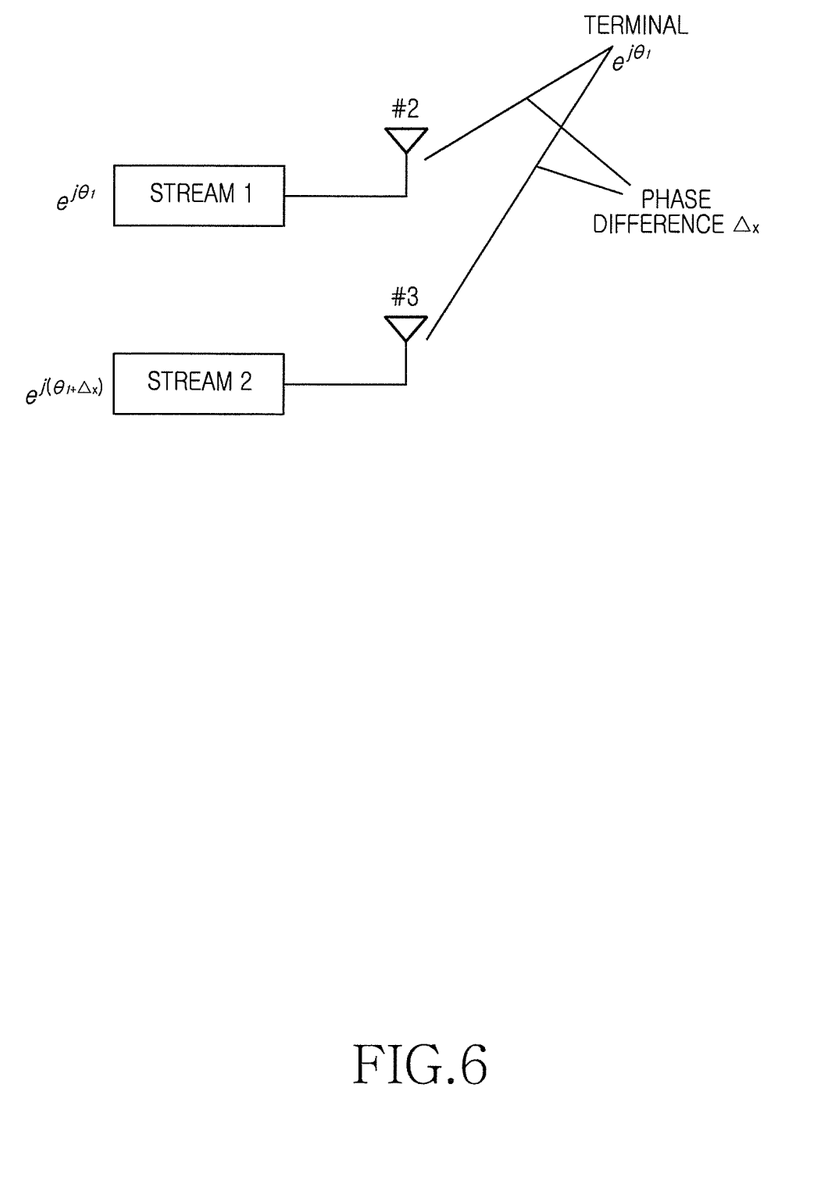
FIG. 6 illustrates of an example where the number of RF chains is equal to the number of antennas according to an exemplary embodiment of the present disclosure.

FIG. 6 illustrates of an example where the number of RF chains is equal to the number of antennas according to an exemplary embodiment of the present disclosure.

Referring to FIG. 6, digital beamforming is possible for all antennas. With respect to each subcarrier, a terminal may feed back channel information to a base station to inform the base station that the terminal is scheduled for a specific subcarrier, so that the base station may perform digital beamforming.

When digital beamforming is used, a digital phase offset may be selected for each RF chain before IFFT in order to compensate for a phase difference between downlink (DL) channels from different antennas. In FIG. 6, an analog phase shift, an analog phase offset, or a phase difference between the antenna 2 and the antenna 3 toward the terminal is $\Delta_x$.

Figure 7:
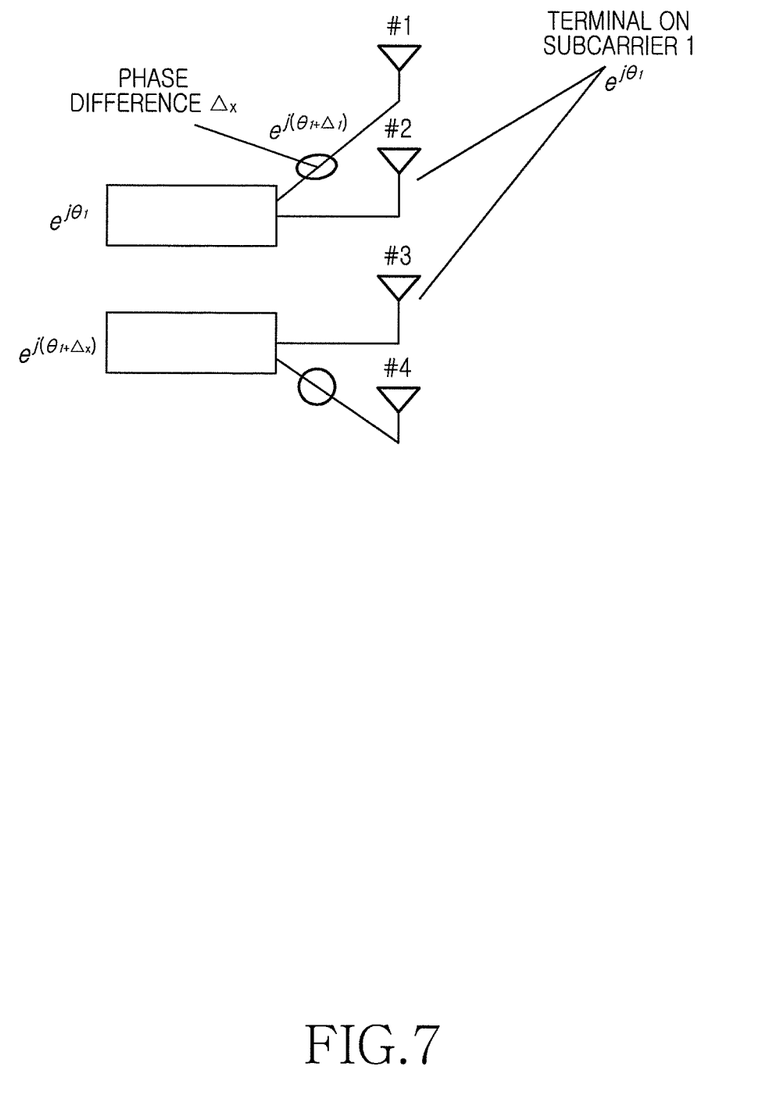
FIG. 7 illustrates of an example where the number of RF chains is smaller the number of antennas according to various exemplary embodiments of the present disclosure.

FIG. 7 illustrates of an example where the number of RF chains is smaller the number of antennas according to various exemplary embodiment of the present disclosure.

Referring to FIG. 7, an analog phase offset or a phase difference for a first antenna for compensating for a DL channel phase difference between an antenna 1 and an antenna 2 with respect to a subcarrier 1 (terminal 1) is $\Delta_1$. In addition, $\Delta_1$ is the same for all the subcarriers.

Figure 8:
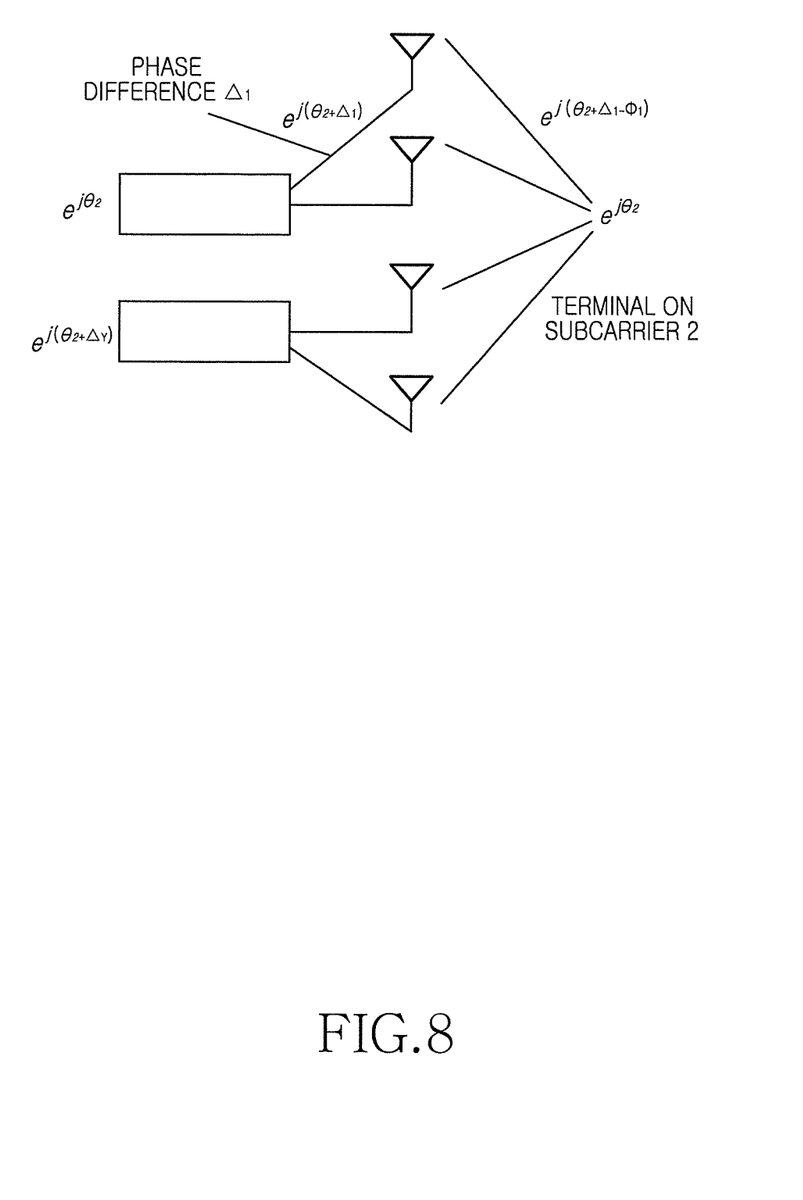
FIG. 8 illustrates of an example where the number of RF chains is smaller the number of antennas according to other exemplary embodiments of the present disclosure.

FIG. 8 illustrates of an example where the number of RF chains is smaller the number of antennas according to other exemplary embodiments of the present disclosure.

Referring to FIG. 8, a terminal 2 is allocated for a subcarrier 2, and a DL channel phase difference between an antenna 1 and an antenna 2 is $\Phi_1$.

In this example, a signal received by the terminal 2 from the antenna 1 and the antenna 2 of a base station is $e^{j(\theta_2+\Delta_1-\Phi_1)}+e^{j\theta_2}$, which is different from $\theta_2$.

This indicates that analog beamforming is focused on the terminal 1 and is not focused on different directions (e.g., the terminal 2).

In order for the terminal 2 to obtain $\theta_2$ aligned at signals from the antenna 1 and the antenna 2 of the base station, the base station needs to compensate for a phase difference or a digital phase offset between signals before IFFT when performing digital beamforming for the terminal 2, according to Equation 1.

$$e^{j\theta_2} \rightarrow e^{j\theta_x}$$

$$e^{j\theta_x} + e^{j(\theta_2 + \Delta_1 - \Phi_1)} = Ae^{j\theta_2}$$

$$e^{j\theta_x}(1 + e^{j(\Delta_1 - \Phi_1)}) = Ae^{j\theta_2}$$

$$e^{j\theta_x}e^{j\theta_y}\text{SQRT}(2(1+\cos)\Delta_1 - \Phi_1)) = Ae^{j\theta_2} \rightarrow A = \text{SQRT}(2(1+\cos(\Delta_1 - \Phi_1))$$

$$\theta_x = \theta_2 - \theta_y \quad (1)$$

Herein, $\Phi_1$ and $\Delta_1$ may be known to the base station by a feedback of the terminal or a predetermined beamforming direction. In addition, A denotes the strength of a merged signal.

That is, an analog beamforming precoder is fixed to one user (e.g., terminal 1), and the same analog beamforming precoder as for the terminal 1 is used for another user (e.g., terminal 2) in analog beamforming.

This indicates that analog beamforming is not optimized for another user (e.g., terminal 2), and in order to compensate for this, the present disclosure compensates for a signal phase for another user (e.g., terminal 2) in digital beamforming. Through this, another user may also achieve an optimal beamforming effect.

To this end, the base station should know $\Phi_1$ and $\Delta_1$. This may be acquired by the base station through feedback, or the base station may use a predetermined value according to a beamforming direction.

The present disclosure uses three methods for allowing the base station to know this phase difference.

In the first method, the base station may preset precoders for analog and digital beamforming. Thereafter, the terminal measures a DL beam and selects optimal analog and digital beamforming precoders.

In the second method, the terminal transmits an uplink (UL) sounding signal to the base station, so that the base station may measure an UL channel. The UL channel may also be used as a DL channel in a time division duplex (TDD) system. Herein, the base station may measure the UL channel and then generate analog and digital beamforming precoders optimal for the terminal.

In the third method, the base station transmits a DL reference signal to the terminal. Then, the terminal measures the reference signal, determines analog and digital beamforming precoders based on the measurement, and feeds back the analog and digital beamforming precoders to the base station. However, this feedback may cause a large overhead.

The present disclosure focuses on the second method among the three methods, that is, the transmission of a sounding signal by the terminal. However, the present disclosure may also use the other two methods.

It is assumed that data destined for the terminal 1 is transmitted on the subcarrier 1 and data destined for the terminal 2 is transmitted on the subcarrier 2. It is also assumed that an analog beamforming direction is toward the terminal 1. In addition, a digital beamforming precoder ($[d_1, \ldots, d_n]$) and an analog beamforming precoder ($[a_1, \ldots, a_N]$) are selected by the base station. In an OFDMA system, all the users scheduled for one symbol have the same analog beamforming precoder.

However, since the positions of terminals are different from each other, the base station uses different digital beamforming precoders for the respective terminals.

With respect to the first antenna of the base station, signals from the other antennas are aligned with the first antenna 1. In addition, signals from all the antennas are received by the terminal 1.

When a signal on the subcarrier 1 is received by the terminal 1, it is assumed that a signal received by the terminal 1 is N*s*Ch1. Herein, Ch1 denotes a DL channel of the antenna 1. N denotes the number of antennas. In addition, when a signal on the subcarrier 2 is received by the terminal 2, it is assumed that a signal received by the terminal 2 is X*s*Ch1. However, X is not actually an accurate value, and a signal phase of X*s is different from s. Thus, there is a need for a method of obtaining X.

Since the base station knows a channel state, the base station may determine analog and digital beamforming precoders optimal for each terminal.

The base station transmits s/X*norm(X) instead of s, and the terminal receives s*norm(X)*Ch1. As for another terminal, Ch_1 denotes a channel on a relevant subcarrier of the antenna 1.

In addition, the base station may transmit s/X*norm(X)*(Ch1)'/norm(Ch1), and the terminal may receive s*norm(X)*norm(Ch1). This indicates that it is not necessary to demodulate a pilot in a TX signal.

Herein, X denotes a merged digital and analog beamforming gain. However, this value is not an actual value because the positions of other terminals than the terminal 1 are different from the position of the terminal 1. X is based on a DL channel mismatch of other terminals than the terminal 1 with the terminal 1.

As for the terminal 1, digital beamforming precoders are all 1. The reason for this is that an analog beamforming precoder is already focused on the terminal 1 in a DL channel.

If a phase difference with respect to the antenna 1 is $\Delta_1, \ldots, \Delta_{N-1}$, an analog beamforming precoder is $[1, e^{-j\Delta_1}, \ldots, e^{-j\Delta_{N-1}}]$.

As for the terminal 2, if a phase difference with respect to the antenna 1 is $\Phi_1, \ldots, \Phi_{N-1}$, an analog beamforming precoder is also $[1, e^{-j\Delta_1}, \ldots, e^{-j\Delta_{N-1}}]$.

Herein, it is assumed that n=2, N=4.

However, in this example, a digital beamforming precoder is $[1, e^{j\Theta_1}, \ldots, e^{j\Theta_n}]$. Also, a signal received by the terminal 2 is $[s*(e^{j\Theta_1} + e^{j(\Theta_1 - \Delta_1 + \Phi_1)} + e^{j(\Theta_2 - \Delta_2 + \Phi_2)} + e^{j(\Theta_2 - \Delta_3 + \Phi_3)})*Ch_1]$.

As a result, $X = e^{j\Theta_1} + e^{j(\Theta_1 - \Delta_1 + \Phi_1)} + e^{j(\Theta_2 - \Delta_2 + \Phi_2)} + e^{j(\Theta_2 - \Delta_3 + \Phi_3)}$.

Since the base station knows all the precoders and a channel state of the terminal from a sounding signal, the base station may calculate X and use X to align a phase difference.

Figure 9:
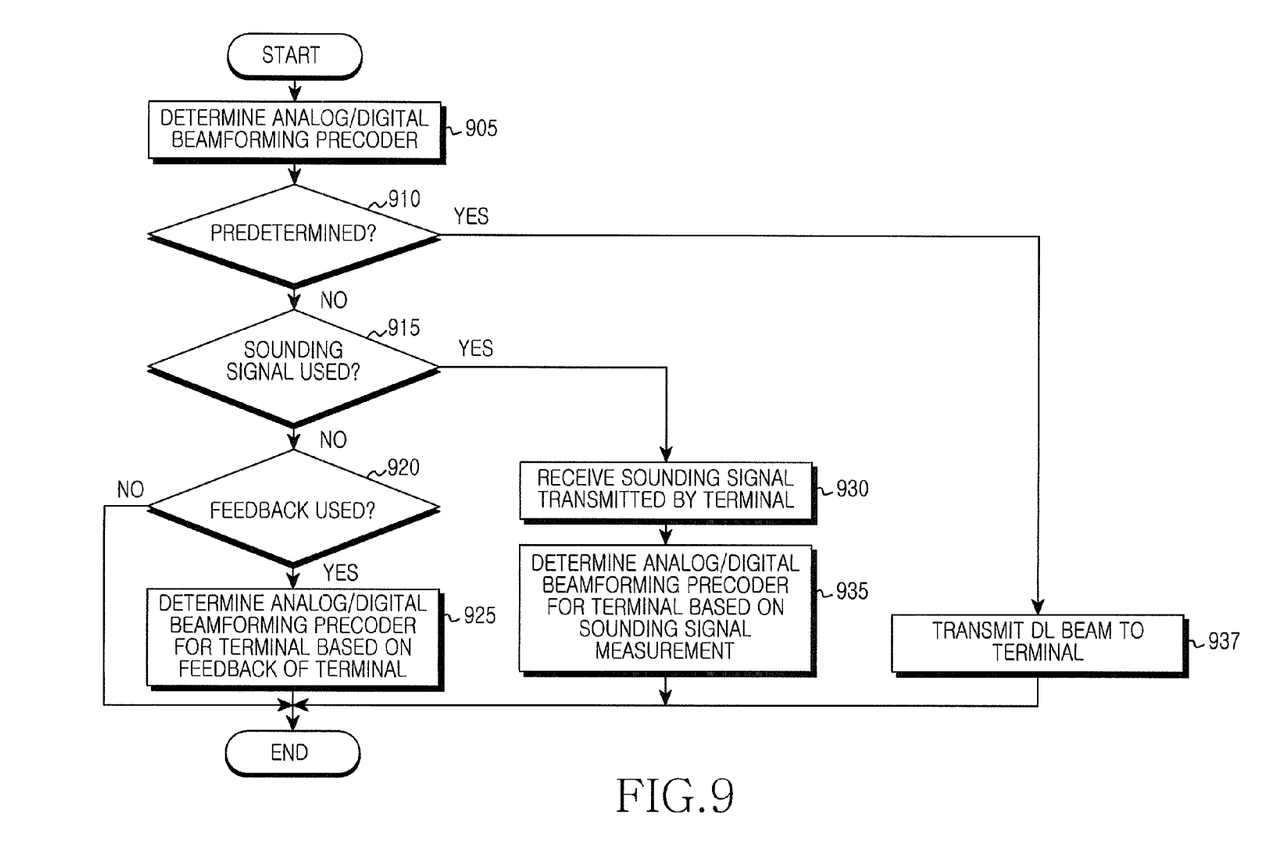
FIG. 9 illustrates a process of a base station according to an exemplary embodiment of the present disclosure.

FIG. 9 illustrates an operation process of a base station according to an exemplary embodiment of the present disclosure.

Referring to FIG. 9, the base station determines analog and digital beamforming precoders (step 905). There may be the following three examples when the base station determines analog and digital beamforming precoders.

If the analog and digital beamforming precoders for a terminal are predetermined (step 910), the base station transmits a DL beam to the terminal (step 937).

If using a sounding signal transmitted by the terminal (step 915), the base station receives a sounding signal transmitted by the terminal (step 930), and determines analog and digital beamforming precoders to use based on a measurement of the sounding signal (step 935).

If using a feedback of the terminal (step 920), the base station determines analog and digital beamforming precoders for the terminal based on the feedback of the terminal (step 925).

The method described above in relation with FIG. 9 under of the present invention may be provided as one or more instructions in one or more software modules, or computer programs stored in an electronic device including a base station.

Figure 10:
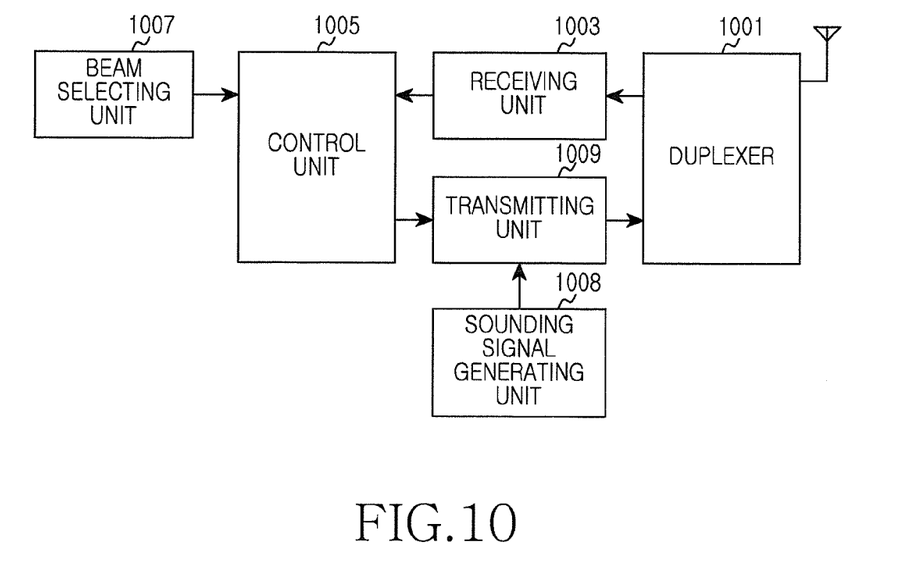
FIG. 10 illustrates a configuration of a terminal according to an exemplary embodiment of the present disclosure.

FIG. 10 illustrates a configuration of a terminal according to an exemplary embodiment of the present disclosure.

Referring to FIG. 10, the terminal may include a duplexer 1001, a receiving unit 1003, a control unit 1005, a beam selecting unit 1007, a transmitting unit 1009, and a sounding signal generating unit 1008.

According to a duplexing scheme, the duplexer 1001 transmits a TX signal, which is received from the transmitting unit 1009, through an antenna and provides an RX signal, which is received from the antenna, to the receiving unit 1003.

The receiving unit 1003 converts an RF signal, which is received from the duplexer 1001, into a baseband signal prior to demodulation. For example, the receiving unit 1003 may include an RF processing block, a demodulating block, a channel decoding block, and a message processing block. The RF processing block converts an RF signal, which is received from the duplexer 1001, into a baseband signal prior to output. The demodulating block performs an FFT operation on a signal received from the RF processing block, to extract data carried on each subcarrier. The channel decoding block may include a demodulator, a deinterleaver, and a channel decoder. The message processing block extracts control information from an RX signal and provides the same to the control unit 1005.

The control unit 1005 controls an overall operation of the terminal. For example, the control unit 1005 controls the beam selecting unit 1007 and the sounding signal generating unit 1008.

The beam selecting unit 1007 receives a reference signal from a base station, and determines analog and digital beamforming precoders optimal to the terminal. To this end, the terminal may prestore an analog and digital beamforming precoder set. Thereafter, the beam selecting unit 1007 may determine an index corresponding to the determined analog and digital beamforming precoders.

The sounding signal generating unit 1008 generates a sounding signal to be transmitted to the base station.

The transmitting unit 1009 encodes a control message and data to be transmitted to the base station, converts the same into an RF signal, and transmits the RF signal to the duplexer 1001. For example, the transmitting unit 1009 may include a message generating block, a channel encoding block, a modulating block, and an RF processing block. The message generating block generates a message including the determined analog and digital beamforming precoders, an index corresponding to this, or a sounding signal. The channel encoding block may include a modulator, an interleaver, and a channel encoder. The modulating block maps a signal received from the channel encoding block to each subcarrier through an IFFT operation. The RF processing block converts a baseband signal received from the modulating block into an RF signal, and outputs the RF signal to the duplexer 1001.

Figure 11:
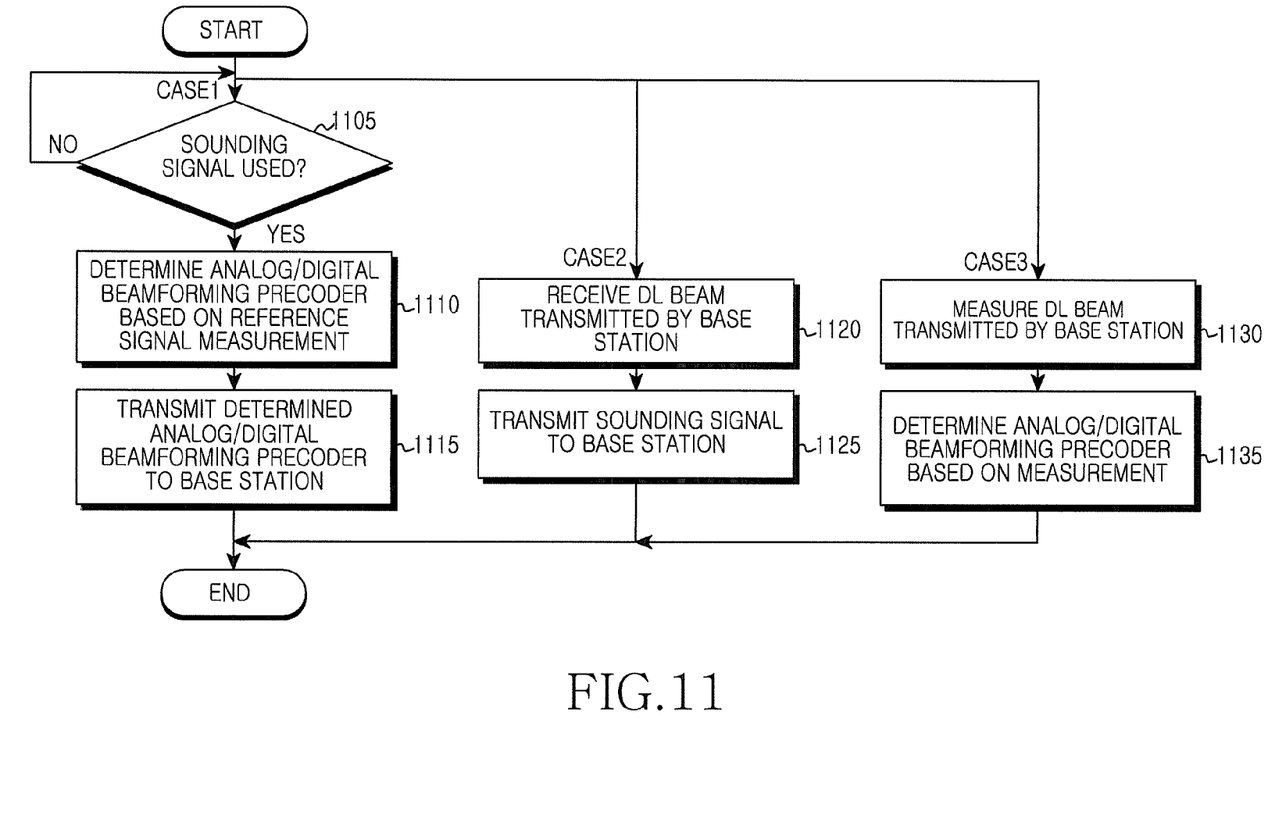
FIG. 11 illustrates a process of a terminal according to an exemplary embodiment of the present disclosure.

FIG. 11 illustrates a process of a terminal according to an exemplary embodiment of the present disclosure.

Referring to FIG. 11, in the case 1, when measuring a reference signal (step 1105), the terminal determines analog and digital beamforming precoders based on the measurement of the reference signal (step 1110). Thereafter, the terminal transmits the determined analog and digital beamforming precoders or an index corresponding to this to a base station (step 1115).

In the case 2, when receiving a DL beam transmitted by a base station (step 1120), the terminal transmits a sounding signal to the base station (step 1125). This example embodiment relates to a TDD system and corresponds to an example embodiment where a DL channel used for transmission of the base station is identical to an UL channel used for transmission of the terminal.

In the case 3, when a base station predetermines analog and digital beamforming precoders, the terminal measures a DL beam transmitted by the base station (step 1130). Thereafter, the terminal determines analog and digital beamforming precoders to be used by the base station based on the measurement (step 1135).

The method described above in relation with FIG. 11 under of the present invention may be provided as one or more instructions in one or more software modules, or computer programs stored in an electronic device including a terminal Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

As described above, the present disclosure performs digital beamforming for compensating other terminals than the terminal 1 for a phase difference caused by an analog beamforming precoder fixed to the terminal 1, when all the terminals use the same analog beamforming precoder in the mixed analog/digital beamforming system. Accordingly, the other terminals can also achieve an optimal beamforming effect.

While the invention has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for mixed analog/digital beamforming by a transmitter in a mobile communication system, the method comprising:
converting a modulation symbol coded and modulated according to a predetermined modulation level into a parallel symbol stream;
performing digital beamforming on the parallel symbol stream by multiplying a second subcarrier to be transmitted to a second receiver by a digital beamforming precoder, the digital beamforming precoder determined to compensate the second subcarrier for an analog beamforming precoder, the analog beamforming precoder optimized for a first subcarrier to be transmitted to a first receiver;
performing an inverse fast Fourier transform (IFFT) operation on the digitally-beamformed parallel symbol stream to generate a time-domain symbol;
converting the IFFT-operated time-domain symbol into a serial time-domain symbol;
inserting a cyclic prefix (CP) into the serial time-domain symbol;
performing a digital-to-analog converter (DAC) operation on the CP-inserted symbol to generate an analog signal; and
performing analog beamforming by multiplying the analog signal by the analog beamforming precoder optimized for the first subcarrier, the first subcarrier transmitted through at least one radio frequency (RF) channel.

2. The method of claim 1, further comprising determining the digital beamforming precoder and the analog beamforming precoder.

3. The method of claim 2, wherein determining the digital beamforming precoder and the analog beamforming precoder comprises determining an optimized digital beamforming precoder and an optimized analog beamforming precoder optimized for a receiver based on a sounding signal transmitted by the receiver.

4. The method of claim 2, wherein determining the digital beamforming precoder and the analog beamforming precoder comprises determining the digital beamforming precoder and the analog beamforming precoder according to feedback from a receiver measuring a reference signal transmitted by the transmitter.

5. The method of claim 4, wherein the feedback includes at least one of a codebook index, a beamforming matrix, and a beamforming precoder.

6. The method of claim 1, wherein the at least one RF channel is connected to an antenna subset of all antennas.

7. The method of claim 1, wherein the digital beamforming precoder is indicated by a digital phase offset determined to compensate the second subcarrier to be transmitted to the second receiver.

8. The method of claim 1, wherein the analog beamforming precoder is indicated by an analog phase offset optimized for the first subcarrier transmitted through at least one RF channel.

9. An apparatus of a transmitter configured to perform mixed analog/digital beamforming in a mobile communication system, the apparatus comprising:
a serial-to-parallel converter (SPC) unit configured to convert a modulation symbol coded and modulated according to a predetermined modulation level into a parallel symbol stream;
a precoder configured to perform digital beamforming on the parallel symbol stream by multiplying a second subcarrier to be transmitted to a second receiver by a digital beamforming precoder, the digital beamforming precoder determined to compensate the second subcarrier for an analog beamforming precoder, the analog beamforming precoder optimized for a first subcarrier to be transmitted to a first receiver;
an inverse fast Fourier transform (IFFT) unit configured to perform an IFFT operation on the digitally-beamformed parallel symbol stream to generate a time-domain symbol;
a parallel-to-serial converter (PSC) unit configured to convert the IFFT-operated time-domain symbol into a serial time-domain symbol;
a cyclic prefix (CP) inserter configured to insert a CP into the serial time-domain symbol;
a digital-to-analog converter (DAC) unit configured to perform a DAC operation on the CP-inserted symbol to generate an analog signal; and
a radio frequency (RF) unit configured to perform analog beamforming by multiplying the analog signal by the analog beamforming precoder optimized for the first subcarrier, the first subcarrier transmitted through at least one RF channel.

10. The apparatus of claim 9, further comprising a control unit configured to determine the digital beamforming precoder and the analog beamforming precoder.

11. The apparatus of claim 10, wherein to determine the digital beamforming precoder and the analog beamforming precoder, the control unit is configured to determine the digital beamforming precoder and the analog beamforming precoder optimized for a receiver based on a sounding signal transmitted by the receiver.

12. The apparatus of claim 10, wherein to determine the digital beamforming precoder and the analog beamforming precoder, the control unit is configured to determine the digital beamforming precoder and the analog beamforming precoder according to a feedback from a receiver measuring a reference signal transmitted by the transmitter.

13. The apparatus of claim 12, wherein the feedback comprises at least one of a codebook index, a beamforming matrix, and a beamforming precoder.

14. The apparatus of claim 10, wherein the transmitter comprises a plurality of RF chains connected to respective antennas, and
wherein each of the RF chains comprises a phase shifter configured to perform analog beamforming on a signal transmitted through each antenna according to a control signal of the control unit.

15. The apparatus of claim 10, wherein the transmitter comprises a switch configured to connect a transmitting/receiving (TX/RX) modem and each of a plurality of antennas, and
wherein the switch is configured to connect the TX/RX modem and at least one antenna according to a control signal of the control unit.

16. The apparatus of claim 15, wherein the control unit is configured to switch on at least one of the plurality of antennas.

17. The apparatus of claim 9, wherein the at least one RF channel is connected to an antenna subset of all the plurality of antennas.

18. The apparatus of claim 9, wherein the digital beamforming precoder is indicated by a digital phase offset determined to compensate the second subcarrier to be transmitted to the second receiver.

19. The apparatus of claim 9, wherein the analog beamforming precoder is indicated by an analog phase offset optimized for the first subcarrier transmitted through at least one RF channel.

20. A method for operating a receiver in a mobile communication system, the method comprising:
measuring a reference signal transmitted by a transmitter;
transmitting feedback information generated based on the measurement; and
receiving a data signal which is beamformed by a digital beamforming precoder and an analog beamforming precoder on a first subcarrier,
wherein the data signal is beamformed, at the transmitter, by multiplying the data signal to be transmitted to the receiver by the digital beamforming precoder, and
wherein the digital beamforming precoder is determined to compensate the first subcarrier for another analog beamforming precoder for a second subcarrier to be transmitted to another receiver.

21. A method for operating a receiver in a mobile communication system, the method comprising:
transmitting a sounding signal to a transmitter; and
receiving a data signal which is beamformed by a digital beamforming precoder and an analog beamforming precoder on a first subcarrier,
wherein the digital beamforming precoder and the analog beamforming precoder is determined based on the sounding signal at the transmitter,
wherein the data signal is beamformed, at the transmitter, by multiplying a signal to be transmitted to the receiver by the digital beamforming precoder, and
wherein the digital beamforming precoder is determined to compensate the first subcarrier for another analog beamforming precoder for a second subcarrier to be transmitted to another receiver.

22. The method of claim 20, wherein the feedback information comprises at least one of a codebook index, a beamforming matrix, and a beamforming precoder.

23. An apparatus of a receiver in a mobile communication system, the comprising:
a controller for measuring a reference signal transmitted by a transmitter;
a transmitting unit for transmitting feedback information generated based on the measurement; and
a receiving unit for receiving a data signal which is beamformed by a digital beamforming precoder and an analog beamforming precoder on a first subcarrier,
wherein the data signal is beamformed, at the transmitter, by multiplying the data signal to be transmitted to the receiver by the digital beamforming precoder, and
wherein the digital beamforming precoder is determined to compensate the first subcarrier for another analog beamforming precoder for a second subcarrier to be transmitted to another receiver.

24. An apparatus of a receiver in a mobile communication system, the apparatus comprising:
a transmitting unit configured to transmit a sounding signal to a transmitter; and
a receiving unit configured to receive a data signal which is beamformed by a digital beamforming precoder and an analog beamforming precoder on a first subcarrier,
wherein the digital beamforming precoder and the analog beamforming precoder is determined based on the sounding signal at the transmitter,
wherein the data signal is beamformed, at the transmitter, by multiplying a signal to be transmitted to the receiver by the digital beamforming precoder, and
wherein the digital beamforming precoder determined to compensate the first subcarrier for another analog beamforming precoder for a second subcarrier to be transmitted to another receiver.

25. The apparatus of claim 23, wherein the feedback information comprises at least one of a codebook index, a beamforming matrix, and a beamforming precoder.

* * * * *